Dec. 22, 1970  TAKESHI YASUDA ETAL  3,549,734
METHOD OF FORMING MICROFIBERS
Filed June 27, 1967

INVENTORS
Yasuharu Fujiwara
Takeshi Yasuda
BY
ATTORNEYS

United States Patent Office 3,549,734
Patented Dec. 22, 1970

3,549,734
METHOD OF FORMING MICROFIBERS
Takeshi Yasuda, 12-302 Nigawa-Danchi, Kashio, Hyogo-ken, Takarazuka, Japan, and Yasuharu Fujiwara, 3-26 Tezukayamanaka, Sumiyoshi-ku, Osaka, Japan
Filed June 27, 1967, Ser. No. 649,208
Int. Cl. B29b 11/04; B29c 25/00; D01f 3/08
U.S. Cl. 264—37                     2 Claims

ABSTRACT OF THE DISCLOSURE

Microfibers are formed by twice extruding a composite blend of two or more fiber forming linear polymers through two successive appropriate spinnerettes and as the last step by removing at least one of the polymers forming the composite fiber by means of a solvent thereby providing a plurality of continuous microfibers which are comprised of the remaining polymers and each of which has a diameter of less than 10 microns.

BACKGROUND OF THE INVENTION (1) Field of the invention

This invention relates to the forming of continuous microdenier fibers by melt spinning a polymeric liquid containing at least two fiber forming linear polymers and, upon the formation of a composite fiber, removing one of the fiber-forming polymers by contact with an appropriate solvent. This invention also includes the formation of a microdenier fiber having substantially microscopic fibrils pendant thereto. This invention further includes the mixing of blendable linear polymers to form composite fibers, firstly, by melting the blendable polymer chips and extruding the melt into filaments and, secondly, by cutting the filaments into short lengths, melting the filament particles and extruding the melt.

(2) Description of the prior art

Synthetic fibers are generally produced by melt spinning or by solution spinning of the polymeric materials. By these processes, a reduced denier filament or fiber may be produced by increasing the number of spinning holes and decreasing the size of the holes and, in some cases, by winding the filaments with the application of a high degree of draft or by stretching the filaments at an appropriate temperature and surrounding medium conditions.

However, by these conventional methods, the finest filament obtainable is considered to be around ten microns in diameter. It has generally been the experience of those involved in the industry that fibers of such a small diameter are produced only with great difficulty and at high cost. High precision equipment is needed and many undesirable problems which are inherent to the practice of these processes must be faced. Quite often, the crystalline structure of the fiber is altered sufficiently to change the basic properties of the fiber e.g. tensile strength, light and dye fastness and the like.

SUMMARY OF THE INVENTION

This invention includes, in essence, the following: a process of mixing a plurality of fiber forming linear polymers so that upon the melt-spinning of the same, a composite filament is formed; the process for forming microdenier fibers by the melt-spinning of at least two fiber forming linear polymers and by the elimination of at least one of the fiber forming polymers after spinning by means of a suitable solvent; and a microfiber formed by the removal of at least one linear polymer from a composite linear polymer filament and having a diameter in the order of one micron or less.

The formation of composite fibers which includes at least two different polymers extruded simultaneously has been the subject of extensive research. If a cross-section of the composite fiber were examined at any point along its length, a portion thereof would be comprised of essentially one of the polymers with the other portion being comprised of essentially the other polymer, for the two polymers have little affinity for each other and thus very little mixing occurs. However, in the preparation of the melt, a separation of the various polymers into distinct layers generally occurs thus prohibiting the extrusion of a filament which, at any portion along its length, contains a constant percentage of the various polymers comprising the melt. Therefore, to obtain a uniform composite fiber, the general practice has been to direct each of the polymers to the spinnerette opening by means of separate channels so that the extruded fiber contains the correct percentages of each of the polymers at any point along the length thereof. Since it can be seen that at least two supply tubes are required for each spinnerette opening, only a few hundred openings can be made in any one spinnerette. Normally, a standard spinnerette extruding only one polymer may contain several thousand openings.

In contrast to the conventional apparatus for forming composite fibers, this invention is adapted to utilize a standard spinnerette while producing the composite fibers. In the mixing of two given polymers, which generally is in the form of small chips, the desired quantity of each polymer is placed into a conventional extruding apparatus and is extruded through a spinnerette, the openings in which measure approximately two millimeters in diameter. The formed filaments are then chopped into lengths of from three to five millimeters and are placed in a second extrusion apparatus. Since each piece of chopped fiber contains portions of the two polymers, the resultant melting of the chopped fibers produces a blend which for any given quantity contains substantially the proportion of polymer as was originally introduced to the system. Upon the extrusion of the chopped filaments through a standard spinnerette to form the composite fibers, the molecules of each of the particular polymers tend to migrate into contact with each other to form uninterrupted i.e. continuous lengths of molecules due to the immiscibility of the polymers.

With regard to the formation of micro-denier fibers having a fiber diameter of less than ten microns, to date, such microfibers have not been produced on a mass production basis. The microfiber of this invention, which has a diameter of approximately one micron, is produced from a composite fiber having two or more polymeric materials. The composite fiber includes a fiber-forming polymer which is ultimately the microfiber and an intermediate polymer. The intermediate polymer is removed from the composite fiber by means of a suitable solvent thus leaving only the fiber-forming polymer.

The microfibers produced by this process are unique in that microscopic fibrils are pendant thereto. Upon the extruding of the composite fibers from the spinnerette, there is a very small degree of mixing of the polymers along their contiguous surfaces so that upon the removal of the intermediate polymer, the small portion of the fiber-forming polymer which was mixed with the intermediate polymer remains attached to the fiber-forming polymer and has the characteristics of small fibrils. These fibrils adapt adjacent fibers to adhere to each other upon spinning or the like, substantially like wool or other natural fibers. In contrast, the surface of most synthetic fibers produced today by melt-spinning is smooth and rod-like and has no tendency to adhere to adjacent fibers.

Also, the microfibers of this invention having fibrils pending thereto are adapted to form excellent filters and other like objects. A fibril like formation on the microfibers can be observed under high magnification particularly when the composite filament is dissolved after the first extrusion step.

Therefore, an object of this invention is to provide fibers having a diameter of approximately one micron with the fibers having microscopic fibrils pending thereto.

Another object of this invention is to provide a process for forming continuous microfibers by extruding a composite fiber comprised of a fiber-forming linear polymer and an intermediate linear polymer and by removing the intermediate polymer by means of a solvent to leave the desired polymer in continuous microfiber form.

A further object of this invention is to provide a method of mixing two incompatible linear polymers in the desired percentages so that upon the extrusion of the polymers into composite fibers, each fiber contains a continuous length of each of the polymers in their original proportions.

These and other objects of this invention will become apparent when the following claims and detailed description are read in conjunction with the appended drawings.

DESCRIPTION OF THE DRAWINGS

FIG. 4 is a perspective view showing how the composite fiber tends to have bunches of organized continuous microfibers alternating with clumps of disorganized, discontinuous microfibers.

DETAILED DESCRIPTION OF THE PREFERRED EMBODIMENT

Figure 2:
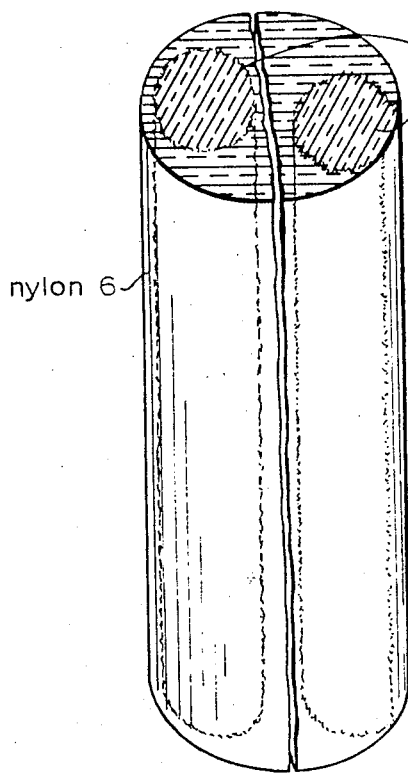
FIG. 2 is a perspective view of a section of greatly enlarged composite fiber showing nylon 6 partially encasing polyoxymethylene microfibers and showing individual microfibers in solution.
Figure 1:
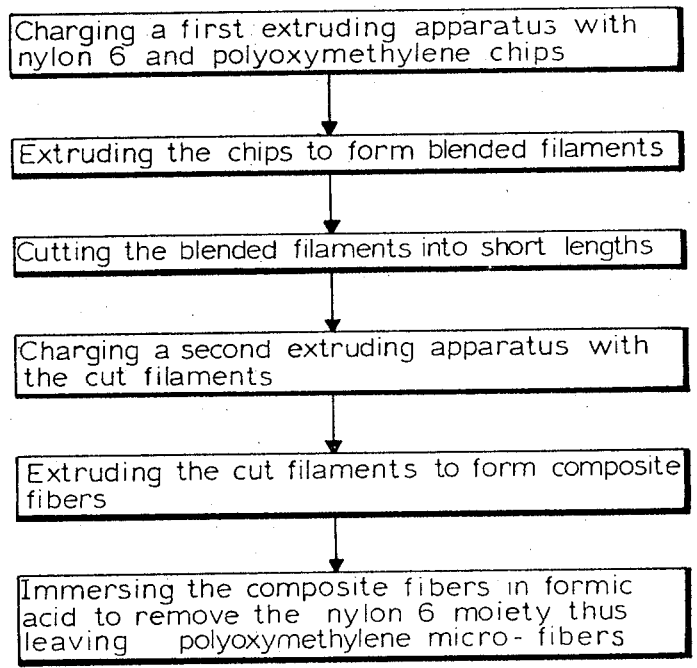
FIG. 1 is a process flow chart showing the various process steps of the invention.

In carrying out the process of this invention to form microfibers, the linear polymers which are to form the composite fibers may be crystalline in nature and have poor mutual compatibility with each other so as to form individual phases upon being melt-spun. It is contemplated that the composite fiber is to be comprised of at least one fiber-forming crystalline polymer and another polymer which may be either a fiber-forming crystalline polymer such as nylon 6 or an amorphous polymer such as polystyrene or a combination thereof. For example, two crystalline polymers having poor mutual compatibility and forming individual phases upon being melt-spun are nylon 6 and polyoxymethylene, polypropylene and polyethylene, polystyrene and polypropylene, and polyester and polyoxymethylene.

To form the microfibers of this invention, a selection is to be made as to the polymer which is to form the microfibers, which hereinafter is called the fiber-forming polymer, and of the polymer which is to accompany the fiber-forming polymer throughout most of the process which for the purposes of this invention may be called the intermediate polymer. The intermediate polymer generally comprises the greater weight of the initial charge to the extruder so that only a small cross-sectional area will be taken up by the fiber-forming polymer. Thus, a weight ratio of 70 percent of intermediate polymer to 30 percent of fiber forming polymer produces the desired results.

A standard extruding apparatus is charged with the appropriate amount of intermediate polymer and fiber-forming polymer. The blended melt is extruded through an appropriate extruding apparatus having openings of approximately 2 mm. in diameter. The resulting filaments contain a blend of the two component polymers; however, the blend is at random and is not coherent throughout the length of the filament as shown in FIG. 4. Note also if the composite filament is dissolved after the first extruder alternating continuous, organized bundles of microfibers and clumps of discontinuous, unorganized microfibers will be obtained. While useful for some applications the higher objective of the invention is to obtain substantially, uniform continuous microfibers and this is obtained only after the second extrusion step. Therefore, after cooling of these filaments, they are cut into short lengths of from three to five mm. after which the lengths are dried. The appropriate temperature to make, for instance, the blended filaments comprised of nylon 6 and polyoxymethylene may range from 200° C. to 230° C. depending upon the particular blend, the temperature being measured at the spinnerette openings. The cut filament lengths are then fed into a second extruding apparatus and melt-spun into fibers through spinnerette openings of approximately 0.5 mm. in diameter and at a spinning speed of from 20 to 200 meters per minute. The screw ratio, lambda/m. of approximately 20 may be used for selected blends with the temperature being from 237° C. to 240° C. The temperature at the spinnerette openings may be from 230° C. to 234° C. and the extrusion pressure may range from 35 to 40 kilograms per square centimeter. The winding speed may be approximately from 20 to 200 meters per minute. Under such temperatures and extruding and winding speeds, non-stretch fibers of approximately 40 denier may be obtained. Quite often, the resulting fibers may be stretched two or three times at 150° C. in a hot air oven whereupon the denier of the filaments is reduced to approximately 24. Depending upon the particular polymers initially charged to the system, the strength thereof may be in the order of three grams per denier with an elongation of approximately 100 percent.

A microscopic examination of the fiber revealed that its outward appearance looks very similar to FIG. 2 herein, thus it can be seen that the blend of the two component polymers did not form a new eutectic mixture, but each of the component polymers formed its own discriminating phase which continued substantially in the same cross-sectional geometric arrangement throughout the length of the filament. To confirm the authenticity of this structure, a mixture of nylon 6 and polyoxymethylene which was melt-spun by the method herein described with a weight ratio of 70 percent of nylon 6 and 30 percent polyoxymethylene was dyed with an acid complex dye (Vialon Fast Red G). Two clearly distinct phases were presented to view, one of which was dyed red, that being the nylon 6, and the other portion remaining unstained. Furthermore, each phase comprising the composite fibers consisted of a crystalline structure corresponding to the particular polymer, this fact being confirmed by X-ray defraction pattern. The distinct polymer phases comprising the filaments were also confirmed by a differential thermal analysis which showed two peaks being identical to the peaks discernible to each component polymer.

The second stage of this invention is to remove the intermediate polymer from the composite fiber to leave only the fiber-forming polymer. The composite fibers which are comprised of a uniform blend of intermediate polymer and fiber-forming polymer are treated with a solvent which dissolves the intermediate polymer thus leaving the fiber-forming polymer. The solvent used to remove the intermediate polymer must not in any way materially affect the properties of the fiber-forming polymer. Thus, where nylon 6 is the intermediate polymer and polyoxymethylene is the fiber-forming polymer, the composite fibers may be treated with formic acid which is a solvent for the nylon 6. The composite fiber may also be treated with a methanol solution of calcuim chloride which also is a solvent for nylon 6. Where polyester comprises the intermediate polymer and polyoxymethylene comprises the fiber-forming polymer, the composite fiber may be treated with parachlorophenol, the polyester being soluble therein. Where polystyrene is the intermediate polymer and polypropylene is the fiber-forming polymer, the composite fibers may be soaked in benzene, the polystyrene being soluble therein. Where polyethylene is the intermediate polymer and polypropylene is the fiber-forming polymer, the polyethylene may be removed by soaking the composite fibers in ligroin.

Figure 3:
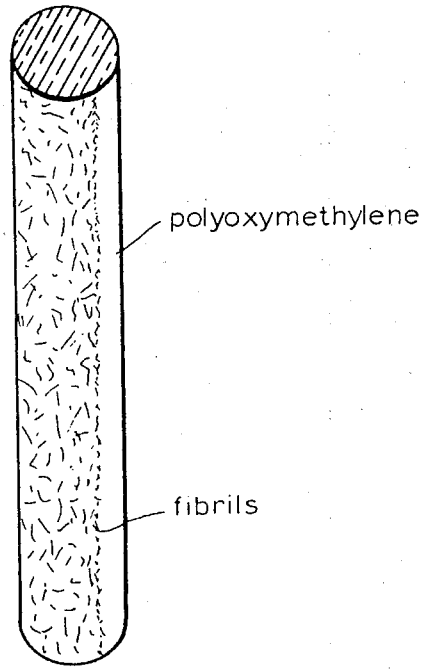
FIG. 3 is a perspective view of a length of fiber greatly enlarged showing the nylon 6 having been removed therefrom leaving a portion of the surface of the remaining polyoxymethylene fiber with pendant fibrils.

The resulting microfilm may have a diameter in the order of one micron; however, the resulting diameter depends somewhat on the initial percentages of the polymers forming the composite fiber and the diameter of the composite fiber. However, experimentation has proven that the relationship between the resulting microfiber and the mentioned prior condition cannot be predetermined arithmetically. In reference to FIG. 3, the resulting microfiber has a portion of its outer surface covered with fibrils, that portion corresponding to the original surface area being in contact with the intermediate polymer prior to the separation. Since there is a slight mixture between the polymers forming the composite fiber along their contiguous areas, the removal of one polymer creates slight voids along the surface of the fiber-forming polymer, thus in effect forming fibrils. As previously mentioned the presence of the fibrils seems to be more evident under high magnification when the intermediate polymer is dissolved after the first extrusion than when the intermediate polymer is dissolved after the second extrusion.

In selecting polymers for the process steps of this invention, the polymers should be linear and should have substantially the same but slightly different melting temperature range since they are to be melt-spun in each of two successive extruders, the polymers comprising the composite fiber should be substantially immiscible, i.e., the fiber forming polymer should not be completely immiscible with the intermediate polymer but in a molecular sense the intermediate should not be immiscible with the fiber polymer, with respect to each other so as to perfect a separation into phases upon the final spinning of the polymers neither should decompose before the other melts, the solvent which is to remove the intermediate polymer should not affect the properties of the fiber-forming polymer and the crystallization of the fiber-forming polymer so that all of the natural characteristics of the fiber-forming polymers are preserved.

EXAMPLE 1

Polyoxymethylene which had an intrinsic viscosity of 1.8 in parachlorophenol at 60° C. and nylon 6 which had an intrinsic viscosity of 1.1 in methacresol at 30° C. were dried before weighing and blended in a ratio of 70 percent by weight of nylon 6 and 30 percent by weight of polyoxymethylene with the total weight of the polymers being 500 grams. The mixed polyoxymethylene and nylon 6 chips were extruded through an extruding apparatus having a diameter of 15 mm. and a nozzle diameter of 2 mm. The resulting blended filaments, after cooling, were cut into lengths of from three to five mm. and were dried. The extrusion temperature was approximately 225° C. at the nozzle.

The cut lengths thus obtained were again extruded through a spinnerette having ten holes of 0.5 mm. and at a spinning speed of approximately 50 meters per minute. The temperature of the extruder screw was approximately 240° C. and the temperature at the spinnerette orifices was approximately 230° C. The extrusion pressure was approximately 40 kilograms per square centimeter. Non stretch fibers of 41 denier were obtained. After stretching the resulting fibers to two times their original length in a 150° C. hot air oven, fibers of 23.7 denier having a strength of 3.09 grams per denier and an elongation of 108.6 percent were obtained.

The composite fibers being comprised of nylon 6 and polyoxymethylene were treated with 98 percent formic acid at room temperature. The nylon 6 was dissolved away in approximately 30 seconds and microfibers of polyoxymethylene were obtained which had a diameter of approximately 1 micron.

EXAMPLE 2

Using the procedure as outlined in Example 1, composite fibers of nylon 6 and polyoxymethylene in the ratio of 50 percent by weight nylon 6 and 50 percent by weight of polyoxymethylene were extruded and stretched at 140° C. in a hot air oven to a ratio of three times their original length. The composite fibers were then treated with 50 percent formic acid aqueous solution at 80° C. The nylon 6 was dissolved away from the composite fibers in approximately 50 seconds leaving polyoxymethylene fibers having a diameter in the order of 1 micron.

EXAMPLE 3

The unstretched composite fibers as produced in accordance with Example 2 were treated with a saturated methanol solution of calcium chloride at room temperature. The nylon 6 was dissolved in approximately 35 seconds and the polyoxymethylene remained as microfibers having a diameter in the order of one micron.

EXAMPLE 4

The procedure of Example 1 was followed with the exception that equal parts of polyester (Toyobo Company, Polyester Copolymer, Viclon V) and of polyoxymethylene (Celanese, Celcon M–25) were blended and spun into fibers. The unstretched fibers were then treated with parachlorophenol at 50° C. The polyester which dissolved out in approximately 5 minutes and the polyoxymethylene fibers remained and had a diameter of approximately one micron.

EXAMPLE 5

The procedure as outlined in Example 1 was followed with the exception that equal parts of polystyrene (Badische Anilin & Soda Fabrik, Polystyrol, III D) and five parts of polypropylene (Avisun, Polypropylene 1021) were blended and spun into filaments. The unstretched filaments were soaked in benzene at room temperature. The polystyrene was dissolved away in approximately 30 seconds and the polypropylene remained as microfibers having a diameter of approximately 1 micron.

EXAMPLE 6

The procedure as outlined in Example 1 was again followed with the exception that five parts of polyethylene (Sumitomo Chemical, Sumidasen 101) and five parts of polypropylene (Montecatini, Moplen S) were blended and then spun into fibers. The unstretched fibers were soaked in ligroin and heated to approximately 50° C. The polyethylene was dissolved away in about three minutes and the polypropylene remained as microfibers having a diameter of approximately 1 micron.

Many different modifications of the invention may be made without departing from the scope and spirit thereof.

Therefore, the applicants do not wish to be bound by the numbers exactly as they appear above except as claimed.

We claim:

1. A two stage extrusion process for forming continuous microfibers having diameters in the general range of one to ten microns comprising the steps of:
  (a) charging a first extruder with two polymers one being designated the fiberforming polymer being selected from the group comprising polyoxymethylene and polypropylene and the other the intermediate polymer being selected from the group comprising polycapramide, linear polyester, polystyrene and polyethylene, said polymers characterized by being linear, being melt-spinnable, being non-decomposable in both said first and a second extruder, having close but different melting points, being substantially immiscible with each other, being in selected shapes in the nature of chips and the like, the fiber forming polymer being selected such that it will form a separate phase from the intermediate polymer in said second extruder, the fiber forming polymer being further selected so as to be fiber forming in both said first and second extruders and the intermediate polymer being selected so that when combined with the fiber forming polymer it may be selectively dissolved therefrom;

(b) melt spinning said polymers in said first extruder to form blended filaments comprising a non-uniform heterogeneous mixture of said polymers;

(c) cutting said blended filaments into short lengths;

(d) charging said second extruder with said cut short length filaments;

(e) melt-spinning said cut filaments in said second extruder to form a uniform heterogeneous mixture of substantially uniform composite fibers comprising continuous lengths of said fiber forming polymer as one phase continuously embedded in said intermediate polymer as a second phase; and (f) continuously dissolving said intermediate polymer out of said uniform composite fibers by continuously and sequentially immersing successive lengths of said composite fibers in a solvent in which said intermediate polymer only is soluble, said continuous lengths forming said microfibers.

2. The process of claim 1 wherein said polyoxymethylene constitutes approximately 30 percent and said polycapramide approximately 70 percent of said polymers entering said first extruder.

References Cited

UNITED STATES PATENTS

| | | |
|---|---|---|
| 3,097,991 | 7/1963 | Miller et al. |
| 3,099,067 | 7/1963 | Merriam et al. _____ 264—344 |
| 3,132,194 | 5/1964 | Edmonds, et al. ____ 264—49X |
| 3,234,313 | 2/1966 | Miller et al. _____ 264—230 |
| 3,323,978 | 6/1967 | Rasmussen _____ 161—169 |
| 3,350,488 | 10/1967 | Breen _____ 264—344 |
| 3,382,305 | 5/1968 | Breen _____ 264—171 |
| 3,359,344 | 12/1967 | Fukushima et al. __ 260—657OL |
| 3,455,773 | 7/1969 | Tessier _____ 264—49X |

FOREIGN PATENTS

| | | |
|---|---|---|
| 1,076,175 | 7/1967 | Great Britain _____ 264—171 |
| 39/6,355 | 5/1964 | Japan _____ 364—171 |
| 132,546 | 5/1949 | Australia. |

JULIUS FROME, Primary Examiner

J. H. WOO, Assistant Examiner

U.S. Cl. X.R.

260—857, 860, 873, 874, 897; 264—143, 171, 344, 349

UNITED STATES PATENT OFFICE
CERTIFICATE OF CORRECTION

Patent No. 3,549,734     Dated December 22, 1970

Inventor(s) Takeshi Yasuda et al.

It is certified that error appears in the above-identified patent and that said Letters Patent are hereby corrected as shown below:

Column 5, line 10, "microfilm" should read -- microfiber

Signed and sealed this 29th day of June 1971.

(SEAL)
Attest:

EDWARD M. FLETCHER, JR.
Attesting Officer

WILLIAM E. SCHUYLER, JR
Commissioner of Patents